United States Patent Office 2,989,435
Patented June 20, 1961

2,989,435
METHOD OF CHEMICAL STERILIZATION OF AQUEOUS LIQUIDS CONTAINING BACTERIA OR SPORES OF BACTERIA
Jacobus Nicolaas Walop, Jan Jacobs, and Cornelis Albertus de Bock, Weesp, Netherlands, assignors to North American Philips Company, Inc., New York, N.Y., a corporation of Delaware
No Drawing. Filed Nov. 27, 1957, Ser. No. 699,190
Claims priority, application Netherlands Jan. 3, 1957
2 Claims. (Cl. 167—33)

There are known a large number of substances having a bactericidal effect.

Some of these substances, for example benzoic acid or salicylic acid, are employed mainly in food industry or the cosmetic industry, whereas others, for example formaldehyde and sodium ethylmercuric thiosalicylate are used in the pharmaceutic industry to produce sterile injection liquids, for example vaccines.

It has now been found that, in order to kill spores of bacteria by chemical means, use may be advantageously made of $\beta$-propiolactone.

It has been found that this compound has a considerably greater effect than formalin and has a wider range of activity than sodium ethyl-mercuric thiosalicylate and is even capable, in a particular concentration, to kill by 90% very resistant spores of bacteria (i.e. of *Bacillus subtilis*), which result cannot be achieved either by said formaldehyde or by the thiosalicylate to the same extent. It should be furthermore noted that $\beta$-propiolactone has been suggested as a medium to render inactive the hepatitis virus, which sometimes occurs in blood plasma. Moreover is known the killing effect on a number of other kinds of viruses, i.e. choriomeningitis, encephalomyelitis and the pseudo fowl plague virus. Under the action of hydroxyl- and of hydrogen-ions, the $\beta$-propiolactone hydrolyzes and forms a hydroxy-acid, which has no longer an inactivating effect. The $\beta$-propiolactone is therefore little suitable to maintain a continual sterility in an aqueous medium, unless, after the addition of $\beta$-propiolactone, the liquids are sealed from possible sources of infection. For this reason the invention is particularly important to obtain sterile, aqueous injection liquids, which are sealed immediately after their production from spores of bacteria. The invention may, moreover, be used to sterilize canned food, which contain comparatively much water, particularly vegetables.

The invention relates to a method of chemically sterilizing aqueous liquids containing bacteria or spores of bacteria and is characterized in that $\beta$-propiolactone is added to such liquids.

The concentration of the $\beta$-propiolactone may vary between wide limits. For practical purposes use will mostly be made of concentrations between 0.5 and 0.001% by weight. As a matter of course the concentration of $\beta$-propiolactone will be chosen to be higher, the more bacteria are contained in the medium to be sterilized.

The invention will be explained with reference to the following experiments.

A culture medium consisting of a solution of 0.5% of peptone, 0.3% of meat extract, in tap water, pH 6–8 (sterilized in an autoclave at 120° for 15 minutes) was produced.

The culture medium was inoculated with *Bacillus subtilis*. The bacteria were allowed to grow at a temperature of 37° for 4 days under aerobic conditions. Subsequently the temperature of the culture was raised to 70° C., while maintaining the aerobic conditions and kept at this temperature for 10 minutes. Then the culture was divided into three portions. To the first portion was added $\beta$-propiolactone in a concentration of 1‰ to the second portion a concentration of 0.1‰ while the third portion served as a check. The bacteria space suspensions thus produced were kept at room temperature for 22 hours. After this period the number of surviving bacteria spores was determined. This was carried out by spreading 0.05 ml. of tenfold dilutions on a solid nutrient agar medium, which contained furthermore 1% peptone, 0.3% of meat extract, 1% of glucose, 0.3% of yeast extract, 1% of $KH_2PO_4$ and by counting the number of grown colonies after having kept the culture for 24 and 48 hours at 37° C.

In order to compare the effect of $\beta$-propiolactone with other bactericides, the aforesaid experiments were also made with cultures to which was added formaldehyde or sodium ethyl mercuric thiosalicylate respectively. Formaldehyde was used in two concentrations, i.e. 0.4‰ and 0.004‰; the thiosalicylate was employed in a concentration of 5.4‰ and 0.54‰. These concentrations and those with which $\beta$-propiolactone was tested corresponded to $14 \times 10^{-6}$ and $1.4 \times 10^{-6}$ mol per ml.

The following table indicates the data of the counting of the colonies. The numbers indicated, as far as they are not related to concentrations, are the logarithms of the number of spores per 0.05 ml. The concentrations indicated are given per ml.

|  | $\beta$-propiolactone | | formaldehyde | | Merthiolate | | Check |
|---|---|---|---|---|---|---|---|
|  | 1 mg. | 0.1 mg. | 0.4 mg. | 0.04 mg. | 5.4 mg. | 0.54 mg. |  |
| *Bacillus subtilis* (spores) | 5.7 | 6.7 | 6.3 | 6.9 | 6.6 | 6.6 | 6.8 |

It is evident from this table that with the tested spores with $\beta$-propiolactone a greater reduction of the number of living spores was found with the use of particular concentration of the $\beta$-propiolactone than with the use of the same molar concentration of formaldehyde or sodium ethyl mercuric thiosalicylate. *Bacillus subtilis* spores were killed 90% by $\beta$-propiolactone in a concentration of 1 mg. per ml., whereas formaldehyde and the thiosalicylate in the same molar concentration had no effect.

What is claimed is:

1. A method of sterilizing aqueous liquids containing spores of bacteria comprising, treating said liquids with $\beta$-propiolactone in a concentration of about 0.5 to 0.001% by weight.

2. A method of preventing the formation of bacteria spores in an injection liquid comprising the steps, of adding $\beta$-propiolactone in a concentration of about 0.5 to 0.001% by weight to a sterile aqueous injection liquid and then sealing the liquid from sources of contamination.

References Cited in the file of this patent

Bernheim et al.: Proc. of the Soc. for Exptl. Biol. Med., vol. 80, pp. 162–4.
Chem. Abst., vol. 49, p. 4080a, 1955.
Chem. Abst., vol. 46, p. 8186b, 1952.
Smolens et al.: Proc. for Exptl. Biol. and Med., vol 86:3, pp. 538–9, July 1954.